(12) United States Patent
De Mattia

(10) Patent No.: US 9,352,432 B2
(45) Date of Patent: May 31, 2016

(54) MACHINING TOOL FOR AN AIRCRAFT FUSELAGE FRAME

(71) Applicant: Airbus Operations SAS, Toulouse (FR)

(72) Inventor: Denis De Mattia, Basse Goulaine (FR)

(73) Assignee: Airbus Operations SAS, Toulouse (FR)

( * ) Notice: Subject to any disclaimer, the term of this patent is extended or adjusted under 35 U.S.C. 154(b) by 293 days.

(21) Appl. No.: 13/845,425

(22) Filed: Mar. 18, 2013

(65) Prior Publication Data

US 2013/0249158 A1 Sep. 26, 2013

(30) Foreign Application Priority Data

Mar. 23, 2012 (FR) .................................... 12 52614

(51) Int. Cl.
| | |
|---|---|
| *B23Q 3/06* | (2006.01) |
| *B25B 5/06* | (2006.01) |
| *B25B 11/00* | (2006.01) |
| *B23Q 3/08* | (2006.01) |

(52) U.S. Cl.
CPC ................ *B23Q 3/062* (2013.01); *B23Q 3/088* (2013.01); *B25B 5/067* (2013.01); *B25B 11/005* (2013.01)

(58) Field of Classification Search
CPC ...... B25B 11/005; B25B 5/003; B25B 5/067; B64F 5/0009; B23Q 3/062; B23Q 3/088
USPC ........................................................ 269/152
See application file for complete search history.

(56) References Cited

U.S. PATENT DOCUMENTS

| | | | | |
|---|---|---|---|---|
| 4,805,887 | A * | 2/1989 | Ray | 269/21 |
| 4,819,922 | A * | 4/1989 | Boike | 269/45 |
| 4,995,146 | A * | 2/1991 | Woods | 29/281.3 |
| 5,121,907 | A * | 6/1992 | Engwall | 269/21 |
| 6,170,157 | B1 * | 1/2001 | Munk et al. | 29/897.2 |
| 6,598,866 | B2 * | 7/2003 | Helm et al. | 269/21 |
| 6,877,203 | B2 * | 4/2005 | Engstrom et al. | 29/407.09 |
| 7,137,202 | B2 * | 11/2006 | Miller et al. | 29/897.2 |
| 7,168,898 | B2 * | 1/2007 | Hamann | 409/199 |
| 2011/0031671 | A1 * | 2/2011 | Toncelli | 269/100 |

FOREIGN PATENT DOCUMENTS

WO 2009128007 10/2009

OTHER PUBLICATIONS

French Search Report, Dec. 3, 2012.

* cited by examiner

*Primary Examiner* — Joseph J Hail
*Assistant Examiner* — Marc Carlson
(74) *Attorney, Agent, or Firm* — Greer, Burns & Crain, Ltd.

(57) ABSTRACT

A tool for machining a curved profile along an axis of rotation X, said curved profile comprising at least one first section along a plane perpendicular to the axis of rotation X and at least one second section parallel to the axis of rotation X. The tool includes blocks, each having a clamping surface against which the profile can take support. The blocks include positioning elements against which the first section and the second section of the profile can take support, and an apparatus arranged to immobilize the profile which is adapted to occupy a first activated state, wherein it immobilizes the profile, and a second deactivated state, wherein it does not immobilize the profile. The tool includes manual presses for maintaining the profile flattened against the positioning elements until the profile immobilizing apparatus is in the activated state.

15 Claims, 4 Drawing Sheets

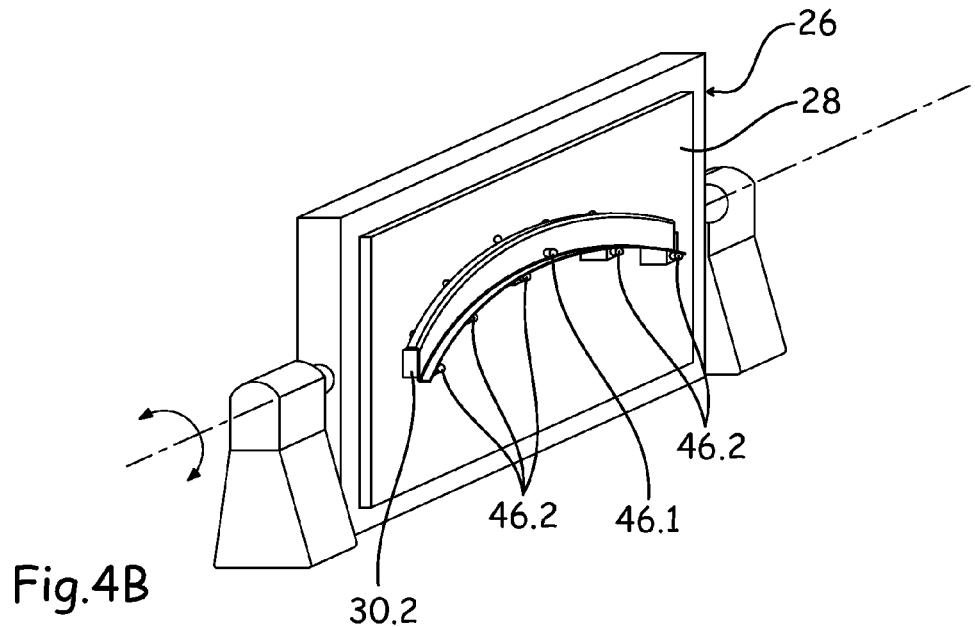
Fig.4B
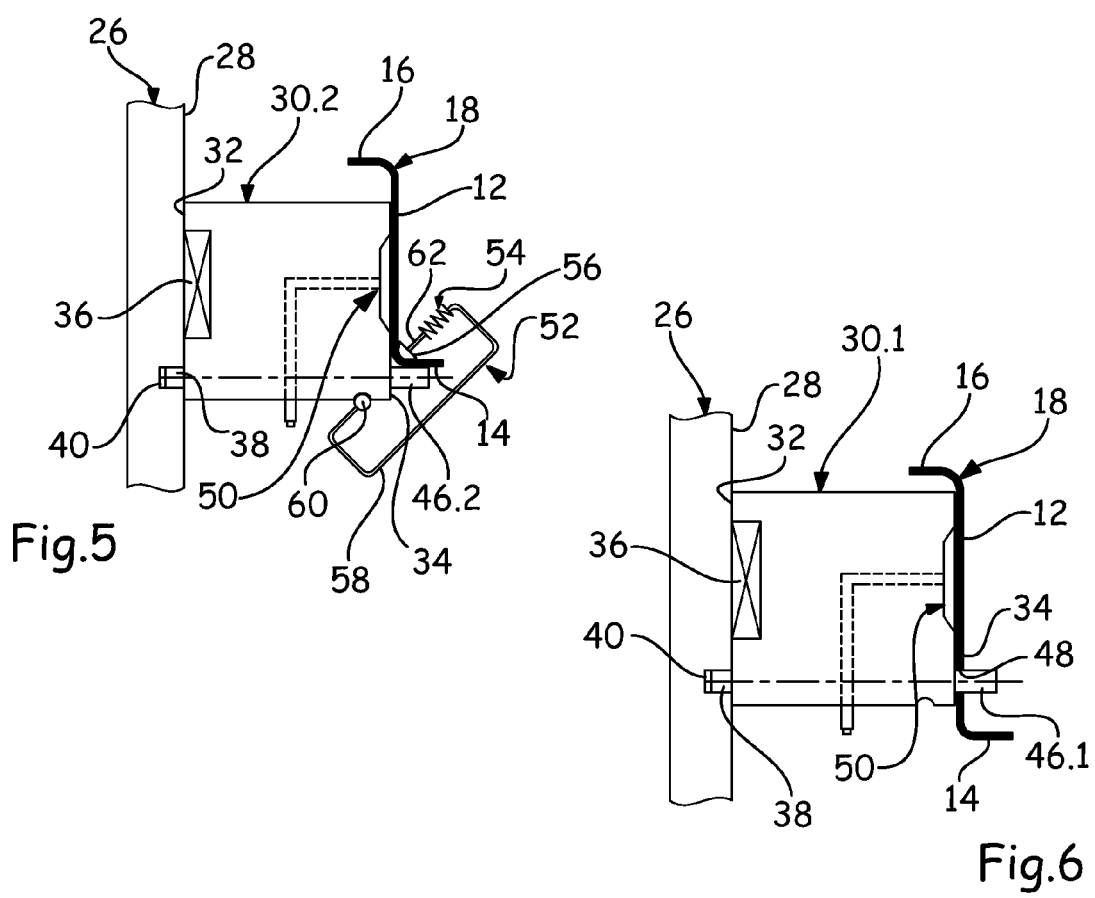
Fig.5
Fig.6

MACHINING TOOL FOR AN AIRCRAFT FUSELAGE FRAME

CROSS-REFERENCES TO RELATED APPLICATIONS

This application claims the benefit of the French patent application No. 12 52614 filed Mar. 23, 2012, the entire disclosures of which are incorporated herein by way of reference.

BACKGROUND OF THE INVENTION

The present invention relates to a machining tool for an aircraft fuselage frame.

As shown in FIG. 1, a fuselage frame 10 comprises a profile having a Z-shaped cross-section whose central portion, referred to as a core 12, forms a complete or partial ring. The profile comprises a first wing 14, referred to as an inner wing, arranged in the area of the inner edge of the core 12 and perpendicular to the latter, and a second wing 16 referred to as an outer wing, arranged in the area of the outer edge of the core 12, also perpendicular to the latter.

This Z-shaped profile follows, in a plane containing the core 12, a radius of curvature. Thus, the two wings 14 and 16 correspond approximately to a portion of a cylinder.

As shown in FIG. 2, as a function of its position in the structure of the fuselage, a frame can be more or less long and the radius of curvature of the wings can be more or less pronounced. Thus, in FIG. 2, an example of a frame is shown in a front view in a continuous line, and other frames with different shapes are shown in dotted form, also in a front view.

According to an embodiment, an aircraft fuselage frame can be made from a composite material and comprise reinforcement fibers embedded in a resin matrix.

After polymerization, a fuselage frame must be subjected to machining operations consisting of routing and then beveling the inner wing 14, routing the outer wing 16, piercing the core 12, and finally cutting the ends of the frame.

For these machining operations to be carried out, the fuselage frame is affixed to a tool arranged in the machine tool unit.

For these machining operations to be carried out while respecting dimensional tolerances, the tool comprises at least one reference surface against which one of the surfaces of the core is flattened and at least one second reference (surface or abutment) against which the inner wing takes support.

According to a first alternative, the tool comprises a first reference surface against which the core takes support and which extends over the entire length of the core, and a second reference surface against which one of the surfaces of the inner wing takes support and which extends over the entire length of the inner wing.

The clamping of the frame on the tool is obtained by a "suction" type clamp. Thus, the reference surfaces comprise depression zones with joints to maintain the core and the inner wing flattened against the first reference surface and against the second reference surface respectively.

After the clamping of the frame to be machined, the different machining operations are carried out. At the end of the machining operation, the operator detaches the machined frame from the tool and cleans the machine tool unit.

To proceed with machining another frame, if the latter has the same geometry as previously described, the operator clamps it on the same tool and restarts a machining phase. If the frame has a different geometry, it is necessary to disassemble the tool in order to install a tool adapted to the frame to be made.

Therefore, according to this first alternative, as many tools as there are frames must be provided. Thus, to be able to machine the frames of different portions of an aircraft fuselage, and thus for the entire range of aircrafts, it is necessary to have a hundred or so different tools, which necessarily has an impact on the manufacturing and storage costs of the tools. In addition, the multitude of tools complicates the management thereof.

According to another drawback, the setting in place of the frame on the tool is a problem because it is difficult to flatten, simultaneously and over the entire length of the frame, the core and the inner wing against the first reference surface and against the second reference surface, respectively, the connection between the frame and the tool being redundant.

According to this alternative, each reference surface comprises zones isolated from one another in the area of which the depression phenomenon is activated, sequentially and gradually as the setting in place is taking place.

To ensure a correct set up over the entire length, the frame must be correctly positioned in the area of the first activated zone. If it is not correctly positioned at the beginning, the defect in the alignment becomes amplified over the length.

The positioning of the frame on the tool is all the more difficult as the joints which border the depression zones have a substantial friction coefficient with the frame and limit gliding.

According to a second alternative, the reference surface of the core is not made in one piece. Therefore, the tool comprises several blocks positioned on a horizontal machining table, each comprising a reference surface provided to be used to support the core.

To ensure the positioning of the frame along the plane of the core, the core is secured onto one of the blocks and the inner wing takes support locally against at least one abutment affixed to another block.

In order to position the frame correctly, it is necessary to use 3 to 7 blocks that can be reused by positioning them correctly for the different geometries of the frames.

According to this alternative, the blocks are set in plate on the table with the head of the machine tool unit and are affixed to the table by a "suction" type clamping system. One of the surfaces of the frame core is attached to the reference surfaces of the different blocks, then the frame is secured onto one of the blocks. Subsequently, one of the surfaces of the inner wing is placed in contact locally with at least one abutment affixed to at least one block. Finally, the frame is affixed to the blocks by a "suction" type clamping system.

After machining, the frame is disassembled.

To proceed with the machining of another frame, if the latter has the same geometry as the previous one, the operator fits it on the blocks and re-starts a machining phase. If the frame has a different geometry, the blocks must be re-positioned on the table.

Even if this alternative makes it possible to reduce the number of tools, it is not fully satisfactory for the following reasons:

Insofar as the blocks are set in place with the assistance of the head of the machine tool unit to position them correctly, their setting in place impacts the productivity of the machine tool unit. The latter is all the more impacted as, according to this alternative, the number of elements to be positioned is greater than for the first alternative.

The piercings to be made in the core must be made with reduced feed rates to limit the delamination risks because for the piercings located outside the blocks, there is no support surface on the periphery of the piercings to take over the piercing forces. Consequently, productivity is further impacted.

According to another drawback, using a horizontal machining table and arranging the plane of the core along a horizontal plane leads to the machining surfaces to be contaminated by the cutting fluid or residues from machining As for the first alternative, the setting in place of the frame on the blocks is difficult.

In addition to the difficulty of the setting in place, if the operator forces to defect in the alignment to be corrected, the frame to be machined can be secured on the blocks with stress, particularly bending stress between the blocks. However, if the frame is machined while it is stressed, it can slightly deform to free the stress when it is unsecured. Pursuant to these deformations, certain dimensional tolerances may no longer be respected. Therefore, according to the second alternative, the beveling operation must be performed in another unit, which hinders productivity.

Thus, the present invention aims at overcoming the drawbacks of the prior art while improving productivity.

SUMMARY OF THE INVENTION

By the method object of the present invention, the acceptance of an aircraft movable control surface is made by controlling its inertial properties (static momentum, frictional momentum and momentum of inertia), such that these inertial properties remain within a certain range. Besides, the method of the invention does not require the removal of the movable control surface from the aircraft.

To this end, the invention provides for a tool for machining a curved profile according to a rotation axis, said curved profile comprising at least one first section along a plane perpendicular to the rotation axis, and at least one second section parallel to the rotation axis, said tool comprising several blocks, each with a clamping surface against which the profile can take support, the blocks comprising positioning elements against which the first section and the second section of the profile take support and apparatus for immobilizing the profile adapted to occupy a first activated state wherein it immobilizes the profile and a second deactivated state wherein it does not immobilize the profile, characterized in that it comprises manual presses allowing for the profile to be kept flattened against the positioning elements until the apparatus for immobilizing the profile is in the activated state.

According to an advantage, using a manual press makes the positioning of the blank on the tool easier, which tends to enhance productivity.

BRIEF DESCRIPTION OF THE DRAWINGS

Other characteristics and advantages of the invention shall become apparent from the description of the invention that follows, a description given only by way of example, with reference to the drawings, wherein:

FIG. 4B is a perspective, schematic view of a tool according to the invention according to which a frame is clamped;

FIG. 5 is a lateral, schematic view of a block according to a first alternative incorporated in a tool according to the invention;

FIG. 6 is a lateral, schematic view of a block according to a second alternative, incorporated in a tool according to the invention;

DETAILED DESCRIPTION OF THE PREFERRED EMBODIMENTS

Figure 1:
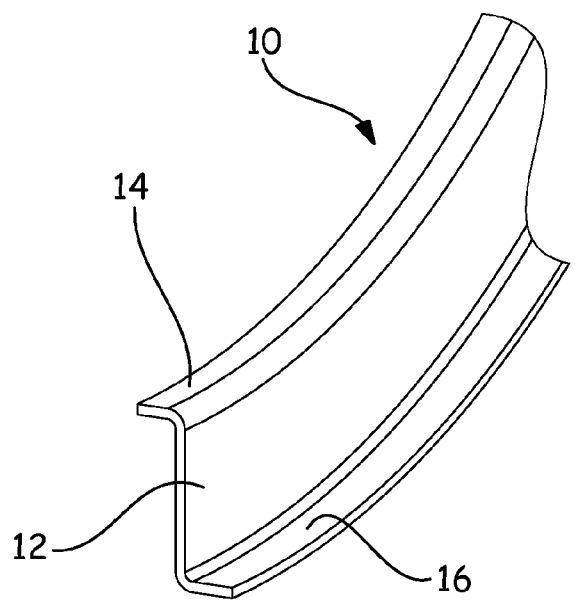
FIG. 1 is a perspective view of part of an aircraft fuselage frame.
Figure 2:
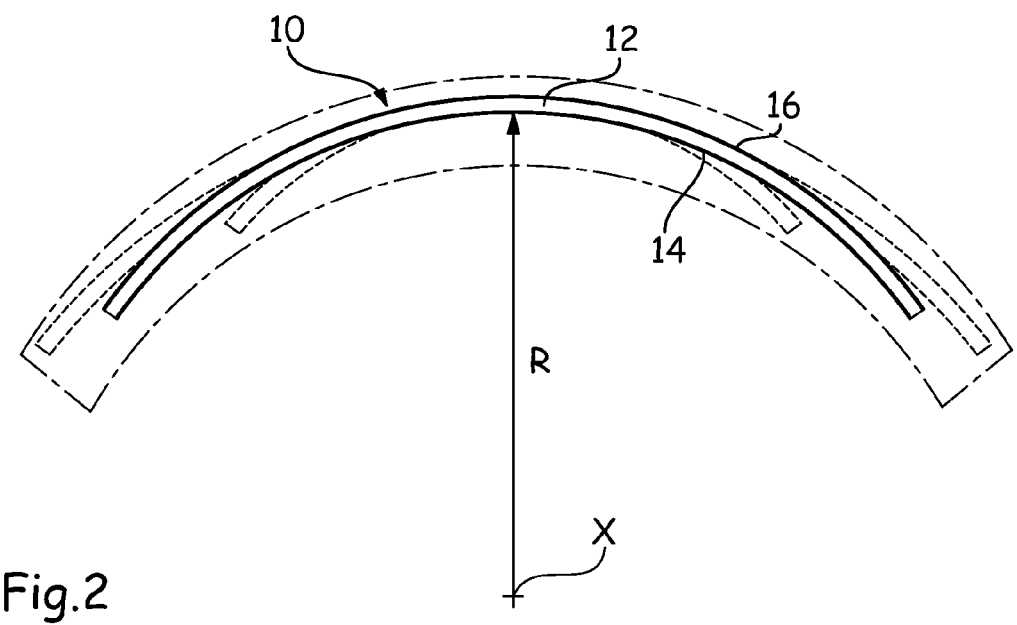
FIG. 2 is a front view showing, in solid line, an aircraft frame, and in broken line, different alternatives of frames.

FIG. 1 shows a fuselage frame 10 in the form of a profile having a Z-shaped cross-section whose central portion, referred to as a core 12, forms a complete or partial ring. The profile comprises a first wing 14 referred to as an inner wing arranged in the area of the inner edge of the core 12 and perpendicular to the latter, and a second wing 16 referred to as an outer wing arranged in the area of the outer edge of the core 12, also perpendicular to the latter.

To give an order of magnitude, the core has an 80-mm height, a thickness on the order of 4 to 6 mm. The wings have a width on the order of 30 mm.

The invention is not limited to this cross-sectional shape and to this application. Thus, the invention can make it possible to achieve several curved profiles with a J, Z, L, Omega-shaped section, or the like.

According to the invention, the profile 10 is curved along an axis of rotation X and a radius of curvature R. Thus, the curved profile 10 comprises at least one first section, more particularly the core 12, in a plane perpendicular to the rotation axis X and at least one second section, more particularly the wing 14, parallel to the axis X. The different sections of the profile are connected together by curved sections. Thus, a first surface of a first section is continuous with a first surface of each other section. These first surfaces form a surface later referred to as an outer surface. Similarly, a second surface of the first section is continuous with a second surface of each other section. These second surfaces form a surface later referred to as an inner surface. The latter comprises portions oriented toward the rotation axis X.

According to an embodiment, this frame is made of composite material.

However, the invention is not limited to this material.

The frame is obtained from a blank 18 wherein at least one machining is performed in the area of the tool machine unit 20.

According to a mode of operation, the machining operations consist of routing and then beveling the inner wing 14, routing the outer wing 16, piercing the core 12, and finally cutting the ends of the frame.

The machine tool unit 20 comprises at least one machining head 22 provided with at least one machining tool 24. The machining head, the tool or tools, as well as means for managing the displacements of the head, are not further described since they are identical to those used for the first alternative of the prior art.

To maintain and position the blank 18, the machining tool unit 20 comprises at least one tool 26.

This tool 26 comprises at least one reference surface 28 onto which several blocks 30.1 or 30.2 are attached, each block comprising two parallel surfaces, a first contact surface 32 flattened against the reference surface 28 and a second clamping surface 34 against which the blank 18 may be supported.

According to a first preferred option, the reference surface 28 is vertical.

This solution makes it possible to prevent the machined surfaces from being contaminated by the cutting fluid or residues from machining. In addition, this solution allows the machining head to be better engaged.

Preferably, one of the surfaces of the core 12 is flattened against the clamping surfaces 34 of the different blocks 30.1 or 30.2 since the core 12 provides a greater planar surface. In addition, this arrangement makes it possible to prevent the surfaces in the area of which the piercings are made from being contaminated by a cutting fluid or machining residues. According to another advantage, this configuration allows the machining head to be better engaged.

According to an embodiment, the blocks 30.1 or 30.2 are immobilized on the table by a clamping system by magnetization. According to an embodiment, the reference surface 28 is metallic and each block 30.1 or 30.2 comprises a non-permanent magnet 36 being flush in the area of the contact surface 32, activated by a control (not shown). Other apparatus could be envisioned to immobilize the blocks 30.1 or 30.2 on the reference surface 28, such as, for example, a clamping system by suction.

In the remainder of the description, reference plane is to be understood as a plane parallel to the reference surface 28. If this surface is not entirely planar, the average surface defined by the planar zones against which the blocks 30.1 and 30.2 are flattened, constitute a reference plane.

According to an important point of the invention, each block 30.1 or 30.2 comprises an indexing element for positioning it in the reference plane.

These indexing elements allow the blocks to be positioned without having to use the machining head as in the prior art. This solution makes it also easier to set up the blocks on the reference surface 28.

Preferably, these indexing elements comprise, for each block, a projecting form 38 (or hollow) that cooperates with a hollow form 40 (or projecting) in order for the block to be immobilized in the reference plane.

This solution makes it possible for the blocks to be maintained on the reference surface even if the latter is arranged to be vertical.

Advantageously, the projecting form 38 and the hollow form 40 are cylindrical in form so as to enable the blocks to pivot about an axis perpendicular to the reference surface.

According to an embodiment, the projecting form 38 is in the form of a cylinder having a diameter D and an axis perpendicular to the contact surface 32. In addition, the hollow form 40 is in the form of a cylindrical hole having a diameter equal to D, give or take pivoting play, with a depth capable of housing entirely the projecting form 38 and an axis perpendicular to the reference surface 28.

Advantageously, the projecting form 38 is provided in the area of the block 30.1 or 30.2 and the hollow form 40 in the area of the reference surface 28.

The tool comprises at least two blocks to clamp a blank 18. According to an embodiment, the tool comprises 3 to 7 blocks to clamp a blank.

To enable the tool to be modulated, the reference surface 28 comprises, for each block, several hollow forms 40 so the tool can be adapted to the curvature of the frame 10.

Figure 4A:
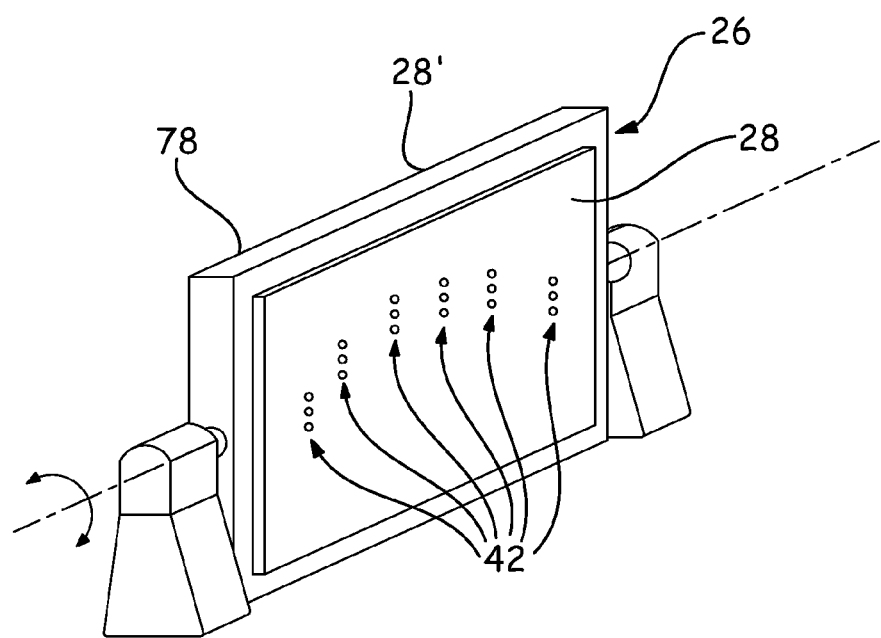
FIG. 4A is a perspective schematic view of a tool according to the invention when empty.

According to an embodiment shown in FIG. 4A, to clamp the longest frames, the tool comprises six blocks. For each block, the reference surface 28 comprises a series 42 of hollow forms 40, the hollow forms of the same series being arranged along a line, the lines of different series being parallel to one another and being vertically oriented.

Preferably, the series 42 are arranged symmetrically with respect to a vertical median axis of the reference surface. This configuration makes it possible to balance the force adjustment.

According to an embodiment shown in FIG. 4A, the reference surface 28 comprises six series 42, each having three hollow forms 40.

Certain blocks 30.1 or 30.2, and preferably all, comprise each an element for positioning the blank 18 to be machined.

According to a characteristic of the invention, each elements for positioning the blank is in the form of a cylinder 46.1 or 46.2, affixed to the block 30.1 or 30.2, and projecting relative to the clamping surface, with an axis perpendicular to the clamping surface 34 and coaxial with the projecting form 38 used for indexing the block 30.1 or 30.2 on the reference surface 28.

This arrangement makes it possible to do without the orientation of the blocks, which facilitates their positioning on the reference surface 28 and limits the hands-on time of the operators.

According to an embodiment shown in FIG. 6, a block 30.1 comprises a cylinder 46.1 capable of housing itself in an opening 48 provided in the area of the blank, the opening 48 having a diameter substantially identical to that of the cylinder 46.1.

According to an embodiment shown in FIG. 5, the other blocks 30.2 each comprise a cylinder 46.2 which serves as an abutment and against which the inner wing 14 can take support. These other abutments make it possible to orient the blank and to position the inner wing correctly.

Each block 30.1 or 30.2 comprises an apparatus for immobilizing the blank 18 adapted to occupy a first activated state, wherein they immobilize the blank, and a second deactivated state, wherein they do not immobilize the blank. According to an embodiment, each block 30.1 or 30.2 comprises a "suction" type clamping system 50. However, the invention is not limited to this immobilization apparatus.

According to a characteristic of the invention, the blocks 30.2 each comprise at least one manual press 52 for maintaining the blank 18 flattened against the positioning elements, and particularly the core 12 against the clamping surface 34 and/or the inner wing 14 against the cylinder 46.2, until the immobilization apparatus is activated.

According to an advantage, using a manual press facilitates the positioning of the blank on the tool, which tends to improve productivity.

According to an important point, a manual press 52 comprises a damper 54 in the form of a spring capable of providing a preloaded force. Therefore, according to the invention, the blank 18 is pre-positioned on all the blocks with different manual presses 52 before it is immobilized with the different "suction" type clamping systems 50. According to an advantage, the manual presses 52, contrary to a "suction" type clamping system 50, allow the section of the blank 18 to slightly glide on the blocks 30.1 or 30.2. In addition, the damper 4 of the manual presses 52 allow the blank 18 to be affixed to the reference surface by balancing the tightening forces over all the blocks.

Thus, the manual presses 52 make it possible to limit the unwanted deflected curves of the frame and this to respect dimensional tolerances.

According to an embodiment, each manual press 52 comprises at least one contact point 56 having a rounded shape capable of taking support in the area of the radius of curvature connecting the core 12 to the inner wing 14. This arrangement enables the core and the inner wing to be flattened with a single contact point.

According to an embodiment, each manual press comprises a C-shaped body 58, a first end 60 being in contact with the block 30.2, the other end 62 supporting the contact point 56, the damper 54 being sandwiched between the contact point 56 and the body 58.

According to an embodiment, the first end 60 can be housed in a notch provided in the area of a lateral surface of the block 30.2. According to other alternatives, the first end could be articulated in relation to the block 30.2.

Figure 7:
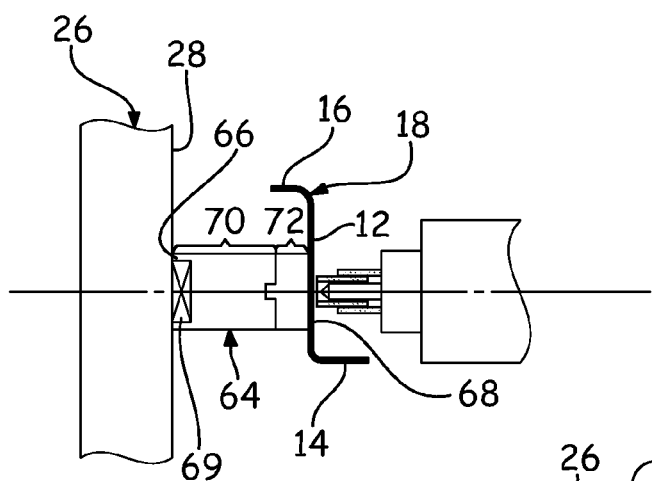
FIG. 7 is a schematic view of an accessory capable of equipping a tool according to the invention.

Advantageously, the tool comprises piercing studs 64, an example of which is shown in FIG. 7. Each piercing stud 64 comprises two parallel surfaces, a first contact surface 66 flattened against the reference surface 28 and a second contact surface 68 against which the blank 18 can take support. The blocks and studs have the same height so that the core of the blank can be in contact with the clamping surfaces 34 and the contact surfaces 68. The piercing studs 64 are arranged along the extension of the axis of each piercing located in zones not in contact with a block and constitute a counter-support for preventing the delamination of the blank. This arrangement contributes to improving productivity.

According to an embodiment, the piercing studs 64 can be cylindrical.

Advantageously, they each provide a contact surface 68 against which the blank can take support all around a piercing hole.

Each piercing stud 64 comprises a clamping system by magnetization to immobilize it on the reference surface 28. According to an embodiment, the reference surface 28 is metallic and each piercing stud 64 comprises a non-permanent magnet 69 flush in the area of the contact surface 66, actuated by a control (not shown). Other apparatus could be envisioned to immobilize the piercing studs 64 on the reference surface 28, such as, for example, a clamping system by suction.

Preferably, each piercing stud comprises two portions connected in a manner whereby they can be dismountable; a first portion in contact with the reference surface which forms a body 70 of the piercing stud 64 and a second portion capable of being in contact with the blank which forms an end-piece 72 referred to as a "martyr" capable of being changed.

Figure 8:
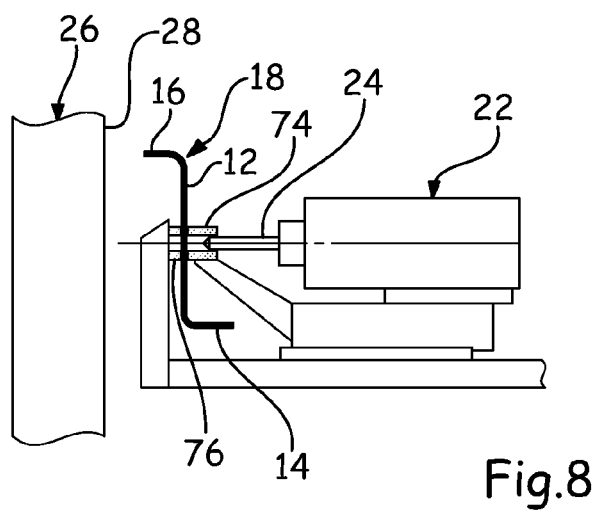
FIG. 8 is a schematic view of an accessory capable of equipping a machining head used to pierce a frame clamped on a tool according to the invention.

Alternatively or complementary to the piercing studs 64, as shown in FIG. 8, the piercing tool can have a support 74 and a counter-support 76 arranged on both sides of the core as shown in FIG. 8.

According to all the alternatives, the tool comprises at least one counter-support against which the frame surface opposite the surface in the area of which the tool penetrates during piercing can take support, said counter-support being stationary or movable and arranged along the extension of the tool during piercing so as to take over the cutting forces and limit delamination risks.

According to another characteristic of the invention, the machine tool unit comprises several reference surfaces 28, particularly two enabling the operator to unclamp a machined frame and to clamp a blank to be machined on a first reference surface while a blank is machined on a second reference surface.

Figure 3:
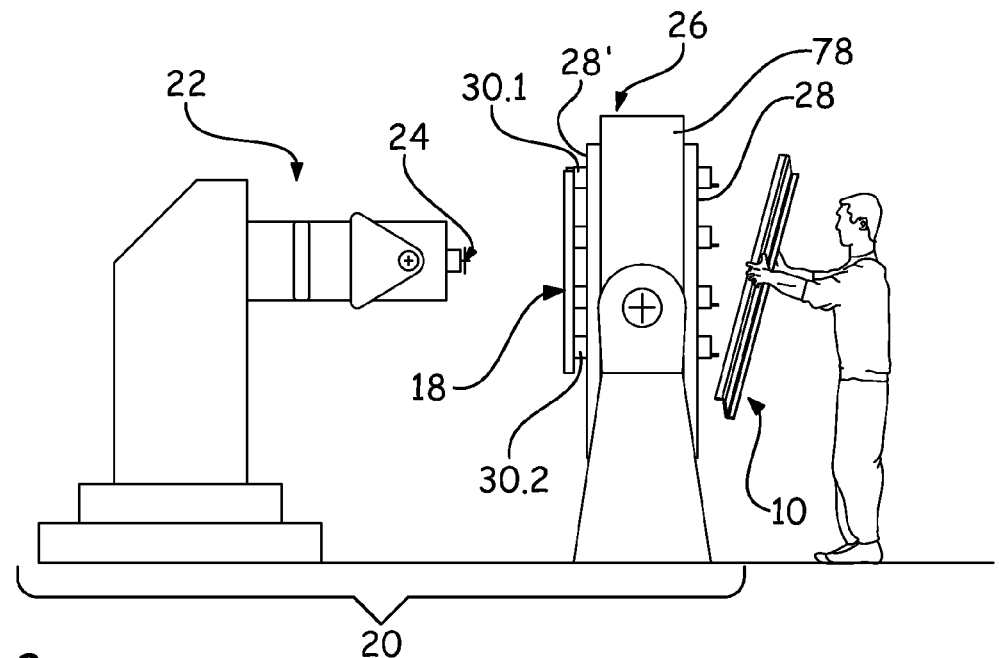
FIG. 3 is a schematic view of a machine tool unit equipped with a tool according to the invention.

According to an embodiment shown in FIGS. 3, 4A, and 4B, the machine tool unit comprises a pivoting table 78 around a horizontal axis, said table comprising two opposite surfaces onto which a first reference surface 28 and a second reference surface 28' are respectively provided. According to this embodiment, while the operator uninstalls a machined frame and installs a blank to be machined on a first reference surface 28, the different machining operations are performed on a blank clamped on the second reference surface 28' facing the tool or tools.

Once the different machining operations are finished, the table 78 pivots so the first reference surface 28 is made to face the tool or tools. The operator can uninstall the machined frame which is clamped on the second reference surface in order to install thereon a blank to be machined.

Alternately, the machine tool unit can comprise two stationary tables, each having a reference surface. In this case, the machine tool can be arranged in a zone arranged opposite a first table to machine a blank clamped on this first table. During the machining period, the operator can uninstall a machined frame on the second table and install thereon a blank to be machined. Once the machining operations on the frame clamped on the first table have been performed, the machine tool and the second table moves in translation so that the machine tool or the second table are arranged facing one another. The blank clamped on the second table is machined whereas the operator can uninstall the frame machined on the first table and install thereon a blank to be machined.

The operating of the tool according to the invention is as follows:

First, the operator installs the different blocks on the reference surface. A laser pointer can assist in determining the hole in each series 44 in which a block must be positioned as a function of the geometry (radius of curvature, length) of the frame to be made. Subsequently, the operator activates the electro-magnet of each block. According to the invention, the blocks do not need to be angularly oriented, which tends to shorten and simplify the setting in place of the blocks and thus, to improve productivity.

Then, the operator pre-positions the blank to be machined on the different blocks. To this end, he positions the cylinder 46.1 of the block 30.1 in the opening 48 provided in the area of the blank. Subsequently, for each block 30.2, he flattens the core and the inner wing against the clamping surface of the block and against the cylinder 46.2, then he sets the manual press 52 in place. Once all the manual presses of the different blocks 30.2 are set in place, the operator can activate the "suction" type clamping systems 50. The blank to be machined is thus perfectly clamped on the tool. The operator can remove the manual presses and start the machining.

The tool allows the inner constraints to be limited. Thus, the machining operations are made while respecting dimensional tolerances since the clamping does not cause unwanted deformations because manual presses are used.

Having two reference surfaces allows for productivity to be improved because the machined frame can be uninstalled and a new blank can be installed in overlapping times.

Finally, using a counter-support enables limiting delamination risks and increasing speeds ahead of time, which contributes to improving productivity.

Although the present invention has been described in connection with various embodiments, it will be appreciated from the specification that various combinations of elements, variations or improvements therein may be made, and are within the scope of the invention.

The invention claimed is:

1. A tool for machining a curved profile along an axis of rotation X, said curved profile comprising at least one first section along a plane perpendicular to the axis of rotation X and at least one second section parallel to the axis of rotation X, said tool comprising a plurality of blocks, each having a clamping surface against which the profile can take support, each block comprising a positioning element against which the first section and the second section of the profile can take support, and an immobilizing apparatus arranged to immobilize the profile adapted to occupy a first activated state, wherein the immobilizing apparatus immobilizes the profile, and a second deactivated state, wherein the immobilizing apparatus does not immobilize the profile, the tool comprising a plurality of manual presses separate from the immobilizing apparatus for maintaining the profile flattened against the positioning element until the profile immobilizing apparatus is in the activated state wherein at least one manual press in the plurality of manual presses and at least one immobilizing apparatus are separately associated with a corresponding block in the plurality of blocks, wherein each block comprises a positioning cylinder and an indexing cylinder, the positioning cylinder projecting outwardly from the clamping surface, with an axis perpendicular to the clamping surface, against which the curved profile is positioned on the block, the indexing cylinder extending between a surface of the block opposite the clamping surface and along a reference plane, arranged so as to enable said block to pivot with respect to an axis perpendicular to the reference plane and coaxial with the axis of the positioning cylinder.

2. The tool according to claim 1, wherein each manual press comprises a body with a first end in contact with the block and a contact point at a second end, a damper being sandwiched between the contact point and the body.

3. The tool according to claim 2, wherein the contact point takes support in the area of a junction zone connecting the first section and the second section.

4. The tool according to claim 1, wherein each block comprises a notch adapted to house the first end of the manual press.

5. The tool according to claim 1, wherein the indexing cylinder projects from each block in the area of the block which cooperates with a hollow form located in an area of a reference surface of the tool.

6. The tool according to claim 5, wherein the reference surface comprises several series of hollow forms, the hollow forms of the same series being arranged along a line, the lines of the different series being parallel to one another.

7. The tool according to claim 5, wherein the tool comprises a plurality of reference surfaces.

8. The tool according to claim 5, wherein the reference surface is arranged along a vertical plane.

9. The tool according to claim 1, wherein the tool comprises at least one counter-support against which a surface of the first profile section opposite a surface in an area of which a machining tool penetrates can take support.

10. The tool according to claim 9, wherein the tool comprises piercing studs in two parts connected in a dismountable manner, a first part in contact with a reference surface of the tool and a second part in contact with the profile and capable of being changed.

11. The tool according to claim 1, wherein the immobilizing apparatus utilizes an attractive force to immobilize the profile.

12. The tool according to claim 11, wherein the attractive force is supplied by suction or magnetism.

13. The tool according to claim 1, wherein each manual press includes a damper providing a variable force allowing the profile to glide on a corresponding block, wherein the profile may be positioned on the tool in a desired location against the variable force provided by each damper, and wherein the profile is fixed in a desired position each immobilizing apparatus providing a force sufficient to maintain the desired position throughout a machining operation.

14. The tool according to claim 1, wherein activation of each immobilizing apparatus clamps the profile to the tool with sufficient force to machine the profile on the tool without additional force provided by each manual press.

15. The tool according to claim 1, wherein the profile curved profile comprises a third section parallel to the axis of rotation X and extending in an opposite direction to that of the second section.

* * * * *